United States Patent Office 3,246,986

Patented Apr. 19, 1966

3,246,986

DIAZO MATERIALS FOR SCREEN PROCESS PRINTING

Henning H. Borchers, Mountainside, N.J., assignor to Azoplate Corporation, Murray Hill, N.J., a corporation of New Jersey No Drawing. Filed Aug. 7, 1961, Ser. No. 129,553

49 Claims. (Cl. 96—35)

The present invention relates to a material and a process for screen process printing and mimeographing. Especially, the present invention relates to an improved screen process material using organic diazo compounds as sensitizers for the colloid coating and to a sensitized emulsion for preparing process screens.

It is well known in the field of planographic printing plates to sensitize colloid layers with diazo compounds. However, planographic printing plates comprise a non-porous carrier material, e.g., metal foils or pretreated paper, and a very thin, light-sensitive layer coated thereon. In using this material, the light-sensitive layer is differentiated, by means of light and a developing step, into areas which are hydrophilic and areas which are hydrophobic and accept greasy ink. With such a surface, prints can be made in the well known offset printing method.

Previously in the practice of screen process printing, the colloid layer used was sensitized practically exclusively with dichromates because best results have been obtained therewith. In the screen printing process, a highly porous carrier material, usually a screen, made of synthetic or natural fibers or metal is stretched on a frame. The screen is coated with a colloid solution containing a sensitizer, and the coating operation is performed in such a manner that the coating solution fills the screen meshes without the formation of pin-holes in the coating.

After drying the coating, it is exposed to light under a master, whereby the colloid coating is hardened in those portions of the layer struck by light. The hardening is proportional to the degree of transparency of the master. On those portions of the coating not struck by light, the colloid layer remains soluble and is removed, for example, by a water spray; the development results in opening of the carrier pores in those portions not struck by light so that in the subsequent printing process the ink or dye can be forced, by means of a squeegee, through these openings onto the material to be printed, in a pattern corresponding to the master used.

The light exposure of a bichromate sensitized screen is difficult since, on the one hand, it is advantageous to expose to light for a substantial period to effect a good hardening of the coating. However, on the other hand, if the exposure to light is too long, a loss of detail in the image results. Thus, in a screen which has been exposed to light too long, portions of the coating under the image become hardened so that the image becomes partially clogged. Therefore, the exposure time of the dichromate sensitized screen must be controlled in a narrow range in order to obtain a sufficient hardening of the coating, which is a prerequisite for attaining a large number of prints and, on the other hand, not too long in order to avoid the closing up effect and accompanying loss of detail.

Furthermore, screen sensitized with dichromate have the great disadvantage of hardening colloids even in the absence of light. This effect known as "dark hardening" makes it mandatory that the coated screens must be processed within a short time, usually within several hours after coating, otherwise development will no longer be possible. Thus, screens cannot be coated in advance which creates quite a number of manufacturing problems. If, for instance, during printing, a screen becomes accidentally damaged, it takes several hours to make a replacement, so that very often a spare must be made as a standby which is a costly procedure. Furthermore, if screens are to be stored for rerun, the unreacted dichromate, which is always present, continues its hardening effect even when the screen is stored in the dark resulting in time in a brittle stencil which cracks or crazes and thus becomes useless. Further, the dichromates have the great disadvantage of being poisonous.

In solution, the dichromates also degrade many colloids even in the absence of light which causes a progressive decrease in the viscosity of dichromate-sensitized emulsions. Therefore, the coating techniques must be adjusted frequently in order to obtain equal deposits.

A further effect of importance in the screen process printing field is the so-called bridging effect. On the margins of the images on the screen, the film deposited should bridge the space between the strands of the screen. Screen printing stencils prepared in the conventional manner are usually of low bridging properties and do not correspond exactly to the master used, which means that a straight line in the master results in a saw-toothed line following the strands of the screen, especially when the margin of the image is at a bias to the screen strands. Therefore, during the printing process, unclear prints are obtained.

Accordingly, great interest exists in an improved sensitized emulsion which overcomes the many shortcomings of the conventional products.

In accordance with the present invention a material is provided for screen process printing, comprising a colloid-containing emulsion, in which the sensitizer comprises at least one condensation product of at least one diazo diphenylamine with at least one aldehyde, condensed in the presence of at least one strong acid, and a highly porous carrier presensitized with the emulsion in which both the emulsion and the resulting presensitized carrier overcome the aforementioned shortcomings of known products.

Highly porous carrier materials used in the screen process printing art and in mimeographing are especially screens or fabrics made of polyamides, polyurethanes, polyvinyl chloride, polyvinylidene chloride, polyesters, silk, cotton, linen, organdy or metals such as copper, brass, bronze, and stainless steel. The screens used generally have the number of 60 to 450 or more. The number, or mesh, refers to the openings per linear inch and is measured from the center of any given wire to a point one inch away therefrom. For example, number 80 square mesh cloth would have 80 x 80 openings per square inch or 6400 openings per square inch. Highly porous papers, such as so-called Japanese tissue or similar materials are also suitable carrier materials when having a porosity range from about ½ to about 40 seconds, as determined by a modified Gurley tester with a ¼ sq. inch orifice, a cylinder of 400 ml. volume and a 5 oz. cylinder load.

For the preparation of the light-sensitive coating, various colloids can be used. Very suitable colloids are, e.g., polyvinyl alcohol, partially acylated polyvinyl alcohol, partially hydrolyzed polyvinyl acetate, partially acetylated polyvinyl alcohol, partially acetylated acylated polyvinyl alcohol, polyacrylic acid, methyl cellulose and gelatin. The synthetic colloids, e.g. polyvinyl alcohol, polyvinyl ester, e.g., polyvinyl acetate, polyvinyl butyrate, etc., as well as partial saponification products and mixtures thereof are especially advantageous. It is possible to incorporate in the colloids also various plasticizers, e.g., tricresylphosphate, phthalic acid ester, such as dibutyl phthalate, dioctyl phthalate and butyl benzyl phthalate; fillers, such as powdered glass, silica, clay, silica gel, aluminum oxide and finely divided plastic powders such as polyamides, polyesters, and vinyl polymerizates, such as polystyrene, polyvinyl chloride, and polyvinylidene chloride. Pigments and dyestuffs may also be added.

The celloids are preferably sensitized with a condensation product of at least one diazo diphenylamine with at least one aldehyde, condensed in the presence of a strong acid. Such preferred condensation products are isolated in the form of a neutral or acid metal salt free salt whereby the anions are for instance of the hydrohalide acids, of nitric acid and sulfuric acid. Others can obviously be prepared which would work similarly. These compounds are characterized by being free of metal salts. Quite unexpectedly it was found that such compounds harden certain colloids in a fashion such that stencils for the silk screen process are obtained which outperform in many ways stencils prepared according to the conventional manner, using dichromates as sensitizers. The well known condensation product of diazo diphenylamine with formaldehyde, isolated as zinc chloride double salt, is, however, poor.

Chromatograms prepared from sensitizers which have been found operable show that condensation products of different molecular weights can be successfully used. Even dimeric condensation products have proven to be very useful sensitizers.

The term "diazo diphenylamine" includes mono-or polysubstituted products, e.g., substitutions by lower alkyl radicals such as methyl, ethyl, propyl, butyl, and amyl; lower alkoxy radicals such as methoxy, ethoxy, propoxy, butoxy, and amyloxy; carboxy, nitro and halogens such as fluorine, chlorine, and bromine. It is apparent that nearly every salt of diazo diphenylamine can be used for the reaction. For practical purposes, and also because they have shown best results, the easily accessible diazo salts, such as the sulfates and the halides, are used.

The diazo diphenylamines are reacted with at least one aldehyde. Generally, lower aliphatic aldehydes are used or mixtures thereof, e.g., acetaldehyde, propionaldehyde, butyraldehyde, isobutyraldehyde, and especially formaldehyde. The aldehydes are used as such or in solution in a suitable solvent or as compounds which form the aldehydes under reaction conditions, e.g., paraldehyde, paraformaldehyde and trioxymethylene.

The condensation is performed using a strong acid as a condensing agent. Especially useful are strong inorganic acids such as sulfuric acid, phosphorous containing acids, such as orthophosphoric acid, metaphosphoric acid, and polyphosphoric acid; hydrohalide acids, e.g., hydrofluoric acid, hydrochloric acid and hydrobromic acid. The acids are used in a concentration which causes no substantial destruction of the reactants. On the other hand, the concentration of the acids should not be so low that no reaction occurs. Generally, the acids are used in concentrations ranging from about 20 to 95 percent, preferably from about 35 to about 90 percent. The concentration of the acid used is varied in accordance to the kind of acid, and the degree of condensation desired. The latter can also be influenced by the ratio of reactants used.

To effect the condensation, the reactants and the strong acid are mixed, usually at room temperature, while stirring. The temperature is maintained below 100° C., preferably below 60° C. It is possible to carry out the reaction at temperatures below 0° C. However, it is most practical to work at temperatures above 0° C., preferably above 30° C., to shorten the reaction time; the latter varies from a fraction of an hour to a few days, usually from a few hours to about one day.

The proportion of diazo diphenylamine to aldehyde used in the condensation reaction ranges from about 0.5 to 3 moles of aldehyde per mole of diazo diphenylamine, preferably from about 0.8 to about 1.5 moles aldehyde per mole of diazo diphenylamine. The strong acid used as the condensation agent is used in an amount permitting mechanical agitation of the reaction mixture. Generally, the strong acid is used in an amount sufficient that at least one of the reactants is dissolved. It is also possible to use the acid in an amount more than sufficient for the solution of all reactants, but, generally, no advantage is obtained. Preferred is a relatively high concentration of the reactant in the condensation medium. While stirring, the reactants are added to the strong acid step-by-step, simultaneously or in succession.

Advantageously, the condensation products are isolated and purified by using well known chemical methods, e.g., when the condensation reaction has been performed in a volatile acid, it is possible to distill off the acid, preferably in a vacuum whereby the condensation product remains as residue, usually in the form of a highly viscous oil or a resin. When performing the reaction in a non-volatile acid, it is possible to precipitate the condensation product by adding a suitable solvent, e.g., a lower alcohol; it is also possible to convert the strong acid used as the condensation agent into the corresponding salt by adding a neutralizing agent, e.g., a metal oxide such as magnesium oxide, calcium oxide, barium oxide, or a metal carbonate such as sodium carbonate, potassium carbonate, magnesium carbonate, barium carbonate, or the corresponding bicarbonates. Usually the salt of the acid precipitates out directly during the neutralizing action, otherwise the precipitation is induced by adding a solvent such as listed above. After filtration, the condensation product is isolated by distilling off the solvent. For the condensation reaction, it is possible to use different salts of the diazo diphenylamine, but for practical purposes inexpensive and easily obtainable salts such as fluorides, chlorides, bromides, and sulfates, are used. If the condensation is performed with such a salt, in the corresponding acid as condensing agent, the corresponding salt of the condensation product is obtained.

If the condensation is effected with such a salt in a non-corresponding acid, a similar, useful condensation product is obtained which is often a mixture of salts or may be a mixed salt. It is also possible to convert a salt of a condensation product to another salt. This is of importance when the condensation is carried out with an inexpensive salt of a diazo diphenylamine or in an inexpensive acid, and it is desired to obtain a uniform salt or a salt having special properties, e.g., the greatest solubility. A conversion of such a salt of a condensation product can be carried out, e.g., as follows: The condensation product, e.g., from formaldehyde and diazo diphenylamine sulfate in sulfuric acid is precipitated with isopropanol and filtered off. The condensation product thus obtained is then suspended in glycolmonomethyl ether. Addition of magnesium chloride results in solution of the condensation product, due to the conversion of the sulfate to a chloride which is soluble in glycolmonomethyl ether. After filtration, the conversion product is then precipitated by adding amylacetate, in which it is insoluble, and isolated by filtering off and drying.

The sensitized colloid solution used for coating the silk screen carrier material is prepared, e.g., as follows: A stock solution of the colloid is first prepared by dissolving the colloid in a solvent, while stirring vigorously. Depending upon the kind of colloid, and its end use, usually solutions containing from about 5 to about 40 percent colloid are prepared, and then, by the addition of more solvent, adjusted to the desired viscosity.

Commercially available dispersions of water-insoluble colloids, e.g., polyvinyl acetate dispersion having a solid content of about 40 to 60 percent can also be used. Advantageously however, a plasticizer is added to such a dispersion in an amount ranging from about 1 to about 30 percent, preferably from about 2 to about 15 percent by weight calculated on the solid content of the dispersion. The basic colloid solution described above is often used in the form of mixtures of different colloids in different proportions and mixed with dispersions of one or more water-insoluble colloids to obtain optimum properties for special applications in the screen process printing field, such as may be required for printing onto various materials or with specialized paints or dyes. In the field of silk screen printing on textiles, in which alkaline vat dyestuffs are used, colloids which are resistant to aqueous alkali and which are not too hydrophilic, e.g., polyvinyl acetate or butyrate or mixtures which contain a predominating part of polyvinyl acetate or butyrate or polyvinyl acetals are generally used, whereas a higher proportion of polyvinyl alcohol may be preferable when oil-based paints are to be used.

The colloids are sensitized by the addition of one or more of the condensation products described above. The sensitizers are primarily used in the form of dilute aqueous solutions which are intimately mixed with the colloid solutions and are added in such an amount that the resulting sensitized colloid solution, usually called an emulsion, has a content of sensitizer from about 1 to about 20, preferably from about 5 to about 15 percent, by weight based on the solid content of the solution. However the sensitizer may also be used in a finely dispersed form.

Such a sensitized emulsion can be stored, in the absence of light, at room temperature for weeks; in a refrigerator for months without a substantial change in the properties thereof.

For the preparation of screens, a highly porous carrier material, usually stretched on a frame, is coated with the sensitized emulsion, advantageously after cleaning the carrier material. The coating is performed, e.g., by brushing the sensitized emulsion onto the highly porous carrier, uniformly distributing it over the carrier and removing the excess of emulsion so that a uniform coating is obtained. Generally, a coating is desirable in which the carrier is encased in the sensitized emulsion. Subsequently, the solvent of the sensitized emulsion is removed, usually by volatilizing in a drying oven. If an especially thick coating is desired, the coating process is repeated. Instead of brushing the sensitized emulsion on the highly porous carrier, any other suitable coating method may be used, e.g., spray-coating or coating by means of rollers or troughs. The presensitized screen process printing material prepared in the manner described above can be stored in the absence of light at room temperature many months, in a refrigerator much longer, and afterwards used in the manner described above since no substantial change in the properties thereof occurs. This is the first known silk screen product using conventional colloids with which this result can be attained, which in itself constitutes a significant commercial progress.

For the preparation of a screen process printing form, also called a stencil, for screen process printing, the coated carrier, usually stretched on a frame, is exposed to actinic light under a master. The exposure time varies according to the sensitizer used, the distance of the light source from the material to be exposed, the intensity of the light source and the transparency of the original. The exposure to light causes a hardening of the sensitized colloid on those portions of the layer struck by light. Afterwards, the stencil is developed by washing away with water or a suitable solvent mixture those portions of the sensitized colloid layer not struck by light and therefore remaining soluble. In the developing step, an opening of the pores of the highly porous carrier material results in the unexposed areas of the colloid layer. The screen process stencil thus obtained can be used in known manner for printing on various kinds of solid materials of plane or spherical shape by forcing, by means of a squeegee, paint through the open pores of the stencil to the material to be printed.

The stencils of the invention have a substantial superiority over the stencils obtained using dichromate as a sensitizer, which hitherto has been considered the best sensitizer in the screen process printing field. It has been possible to obtain many times the number of prints compared with dichromate sensitized colloids without breakdown of the stencil. Due to the unique manner in which these sensitizers harden the cololid, the chemical resistance of the stencil obtained is by far greater compared with that obtained with dichromate, which makes it possible, by proper choice of the colloids, to use stencils according to the present invention even for screen process printing on textiles with alkali-vat dyestuffs in a simple manner eliminating the many steps required today to make a stencil for textile printing, i.e., coating the screen with a dichromate-sensitized emulsion, exposing to light under a reversed master, removal of the unexposed portion by development with water, drying, coating with a caustic resist enamel, drying this enamel for many hours, and finally scrubbing out the image area, which is a tedious operation. Bridging of the stencil or in other words sharpness of the stencil image made according to the present invention is much superior compared with stencils obtained from dichromate-sensitized colloids. In fact, the quality of the image surpasses in many instances the indirect screen process method using carbon tissue. This also is the first time in silk screen history that a stencil can be made by the direct silk screen process using conventional colloids which matches and even surpasses the print definition attainable to date only by the indirect method and, at the same time, permits a length of run in excess of many tens of thousands of prints, which is characteristic of the direct screen process method. Thus, highest quality with great screen durability can now be obtained, which also constitutes a significant progress.

Again, due to the unique manner in which the sensitizers of this invention harden the colloids, stencils have been made which are virtually unaffected by atmospheric fluctuations. Whereas images produced with standard dichromated commercial emulsions undergo dimensional changes depending upon atmospheric conditions, it is now possible by proper choice of colloids and sensitizers to produce images which change only insignificantly when exposed even to the most adverse atmospheric conditions. Thus, for instance scales can now be reproduced by the silk screen method in an accuracy unknown heretofore in the silk screen printing process. It further introduces the possibility to use the silk screen process for multi-color register work. Again, this is the first time such results have been attained with conventional type colloids and constitutes a further significant commercial progress.

The condensation products of diazo diphenylamines with aldehydes may be prepared, for example, according to the methods described in applications Serial Nos. 124,805, now abandoned, 124,791, 124,786, now Patent No. 3,163,633 and 124,777, filed July 18, 1961.

The invention will be further illustrated by reference to the following specific examples:

*Example I*

A series of tests was run in order to show the superiority of various diazo sensitizers to the previously used ammonium dichromate in hardening colloids for use in screen process printing.

In this series of tests, a commercial silk screen emulsion containing polyvinyl alcohol, polyvinyl acetate and small quantities of plasticizers and having a total solids content of approximately 38% was used. This emulsion is marketed under the name of "Wittol" and is supplied by the Active Supply Company of New York city. The basic emulsion was sensitized by admixing it with an aqueous solution of the diazo sensitizer to be evaluated and, for comparison, the emulsion was admixed with ammonium dichromate in the concentration recommended by the supplier, i.e., 3.6 grams of ammonium dichromate dissolved in 20 ml. of water per 100 grams of emulsion.

The thus sensitized emulsions were applied to 196 mesh standard screen process nylon, purchased from Drakenfeld of New York city. The coating was brushed onto one side and then onto the other side of the screen, the excess being removed first from one side and then from the other with a stiff scraper using even pressure in order to obtain a uniform coating of uniform thickness. Only one coat was applied. The coatings were then allowed to dry for one hour in a dust free cabinet at a temperature of 30 to 40° C. at which time the screens were exposed in the conventional manner to a test film, using a standard arc lamp. The exposure time was constant in all tests, i.e., two minutes whenever 0.5% sensitizer was added and three minutes whenever 2% sensitizer was added.

Development was effected in the standard manner by spraying the image with a jet of warm water. After development, the screens were dried and judged for image quality. The abrasion resistance and resiliency of the screen was tested on a specially constructed device in which the screen was suspended firmly in a frame with a clearance of the screen to the bottom plate of ⅛ inch.

A copious quantity of paint consisting of squeegee oil, No. 175, supplied by Drakenfeld, into which was blended an abrasive pigment, was poured onto the screen. (Squeegee oils are defined as oils free of tarry or carbon residue which must volatilize within a very narrow range. They are used mainly for decorating ceramics. On subsequent firing the oils must volatilize completely and leave no traces of a tarry or carbon residue since this would impair the color and also cause the design to blister.) A neoprene squeegee was then wedged firmly between the screen and the squeegee carrier. This squeegee was moved alternately back and forth across the stencil by the means of a reciprocating rod attached to a motor driven wheel. The number of strokes was determined with an automatic counter and, at the end of each 1,000 strokes, the screen was removed, washed out and a print on high gloss paper was made. Both print quality and the appearance of the stencil were judged. If the screen was found to be perfect it was remounted into the machine and the run was continued in the manner described above. After an additional 1,000 strokes, a second test print was made and judged. This procedure was repeaed until the screen began to show signs of wear.

*Example II*

The commercial silk screen emulsion described in Example I above was sensitized with ammonium dichromate added in the proportions described in Example I above.

The quality of the image produced with this emulsion was fair and, under the conditions of the tests described in Example I above, the stencil showed major breakdown at the end of 5,000 strokes.

*Example III*

A diazo sulfate was prepared by the following procedure:

A 5 liter glass beaker was charged with 2 pounds of 60° Baumé sulfuric acid and the temperaure was reduced, by external cooling, to approximately 10° C. To this, 0.44 pound of paradiazodiphenylamine sulfate was added while stirring, keeping the temperature well under 15° C. Thereafter, an equimolecular amount of paraformaldehyde was slowly added and the temperature of the mixture was then raised to approximately 40° C. and maintained for 2 hours. After cooling to room temperature, the condensation mixture was poured slowly into 4 liters of isopropanol, while stirring, at a temperature below 20° C. The precipitate formed was collected on a Buchner funnel and washed with cold isopropanol to remove excess sulfuric acid. Finally, the wet filter cake was dried in a vacuum desiccator.

2 grams of this product were dissolved in 20 ml. of water and blended into 100 grams of the commercial silk screen emulsion described in Example I above. After coating, drying, exposing, and developing test screens in the manner described in Example I above, the image appearance was judged and found to be very well defined.

The abrasion resistance of the stencils was very good, averaging approximately 15,000 strokes.

*Example IV*

0.5 gram of a diazo sensitizer prepared according to the procedure of Example I of copending application Serial No. 124,791 was dissolved in 20 ml. of water and blended into 100 grams of the commercial silk screen emulsion of Example I above. A test screen was prepared in the manner described in Example I above and the image quality thereof was found to be very good. After 20,000 strokes only minor breakdown was evident.

*Example V*

0.5 gram of a diazo sensitizer prepared in accordance with the procedure of Example 2 of copending application Serial No. 124,805 was dissolved in 20 ml. of water and blended into 100 grams of the commercial silk screen emulsion described in Example I above. A test screen was prepared according to the procedure of Example I above and the stencil showed no breakdown after 12,000 strokes.

*Example VI*

0.5 gram of a diazo sensitizer prepared according to the procedure of Example III of copending application Serial No. 124,786 was dissolved in 20 ml. of water and blended into 100 grams of the commercial silk screen emulsion described in Example I above. A test screen prepared according to the procedure of Example I above showed only minor breakdown after 20,000 strokes.

*Example VII*

0.5 gram of a diazo sensitizer prepared according to the procedure of Example VI of copending application Serial No. 124,805 was dissolved in 20 ml. of water and blended into 100 grams of the commercial silk screen emulsion described in Example I above. A stencil prepared from the sensitized emulsion was found to be superior to a similar screen sensitized with ammonium dichromate.

*Example VIII*

A diazo iodide sensitizer was prepared as follows:

5 grams of the diazo sensitizer prepared according to the procedure of Example I of copending application Serial No. 124,791 were dissolved in 100 ml. of distilled water and, while stirring, a solution of 3.82 grams of sodium iodide ($NaI \cdot 2H_2O$) in 100 ml. of distilled water was added. The precipitate was filtered off and resuspended in 100 ml. of distilled water, stirred for 2 minutes and refiltered. The solids were finally suspended in 100 ml. of isopropanol, filtered, subsequently washed with a small amount of ether and dried in air. The yield was approximately 4.2 grams of a yellow to orange colored diazo iodide. The solubility of this compound in water is very low. It is slightly soluble in methanol, ethanol, butylacetate, Cellosolve, and quite soluble in dimethylformamide and dimethyl-sulfoxide. It is practically insoluble in benzene and toluene. The compound is fairly stable and has a good shelf life.

Because of the low solubility of this compound in water, it was used with good success by dispersing it in the silk screen emulsion. This is a new way of sensitizing silk screen emulsions since sensitizers are usually used in the form of solutions and not as dispersions.

The dispersion was prepared as follows:

To 100 grams of the commercial silk screen emulsion, described in Example I, 1 gram of potassium iodide, dissolved in 8 grams of water, was added and thoroughly mixed in. While continuously stirring, a solution of 1 gram of a diazo sensitizer prepared according to the procedure of Example I of copending application Serial No. 124,791 in 7 grams of water and mixed in very slowly. The emulsion turned orange in color. The abrasion resistance of the finished stencil was, under the condition of the test, superior to ammonium dichromate sensitized products.

*Example IX*

5 grams of the diazo sensitzer prepared according to the procedure of Example I of copending application Serial No. 124,791 were dissolved in 25 ml. of water. A saturated aqueous solution of 2.2 grams of sodium nitrate was then added, resulting in a precipitation of the diazo compound which was then separated from the aqueous mother liquor, washed with 5 ml. of distilled water and reseparated from the aqueous phase. The precipitate was dissolved in 11.5 ml. of methanol and added, while stirring, to 115 ml. of isopropanol, whereupon the diazo crystallized out in an easily filterable form. The solid was then filtered off, washed with a small amount of isopropanol and finally dried under vacuum. The yield was approximately 3 grams of the diazo nitrate.

This compound must be handled with some degree of care since it tends to decompose upon heating. The solubility of the compound in water is fair. It is soluble in methanol methyl-Cellosolve, ethylene glycol, acetone and dimethyl formamide. It is slightly soluble in ethanol and practically insoluble in isopropanol, Cellosolve acetate, butyl acetate, carbon tetrachloride, benzene and toluene.

In 100 grams of the commerical silk screen emulsion described in Example I above, 1 gram of barium nitrate, dissolved in 8 grams of water, was dissolved and mixed in thoroughly. Into this mixture, one gram of the diazo sensitizer prepared in accordance with the procedure of Example III above, dissolved in 7 grams of water, was slowly added while continuously stirring. The finished emulsion turns a dark orange to brown color and results in a stencil having an abrasion resistance just under 10,000 strokes under the conditions of the test described in Example I above.

Instead of using barium nitrate, which forms with a sulfate of the diazo sensitizer of Example III above an insoluble barium sulfate, which in turn remains finely suspended within the emulsion, an equivalent amount of sodium nitrate can be added to the emulsion. By this procedure, both diazo sulfate and the diazo nitrate are present in the emulsion and this also results in a final stencil which shows an abrasion resistance superior to standard dichromate sensitized products. By this procedure, a simple method is provided for obtaining diazo sensitizers having mixed anions.

*Example X*

A solution of 1 gram of the diazo sensitizer prepared according to the procedure of Example V of copending application Serial No. 124,805 in 20 ml. of water was blended into 100 grams of the commercial silk screen emulsion described in Example I above and a test screen was prepared according to the procedure described in Example I. The image quality was good and many thousand prints could be made without breakdown of the stencil under the conditions of the test.

*Example XI*

0.5 gram of the diazo sensitizer described in Example I of copending application Serial No. 124,791 dissolved in 20 ml. of water was added to 100 grams of the commercial silk screen emulsion described in Example I above. The emulsion was permitted to stand at room temperature for four weeks. No change in the sensitized emulsion occurred during this storage period.

The sensitized emulsion was then used to coat a nylon 196 mesh screen, coating being effected by brushing the sensitized emulsion onto the screen and scraping off the excess by means of a stiff piece of cardboard. The coated screen was allowed to dry at room temperature for approximately 1 hour and then exposed in the conventional manner under a positive original. The image developed easily and the stencil obtained was excellent. This example is exemplary of the excellent shelf life of the screen process emulsions of the present invention.

*Example XII*

100 grams of the commercial silk screen emulsion described in Example I above were sensitized and coated on a nylon 196 mesh screen as in Example XI above. The coated screen was stored in the absence of light for two weeks and then processed as in Example XI. The storage of the coated screen did not impair the processing properties thereof and a well defined, clean stencil was obtained.

*Example XIII*

0.5 gram of the diazo sensitizer described in Example III of copending application Serial No. 124,786 dissolved in 20 ml. of water was blended into 100 grams of the commercial silk screen emulsion described in Example I above. A Dacron No. 12 screen was coated with this emulsion by pouring a bead across the leading edge of the screen and pulling this bead down by means of a squeegee. After drying at room temperature, the coated screen was stored in the absence of light for six weeks and then processed according to conventional procedures, which resulted in a well defined, sharp stencil. The same emulsion was coated onto nylon 196 mesh in the same manner and stored for four weeks at 40° C. prior to exposure and development. Even this extended storage time at elevated temperatures did not impair processing and the resulting stencil was excellent.

*Example XIV*

0.5 gram of the diazo sensitizer described in Example III above dissolved in 20 ml. of water was blended into 100 grams of the commercial silk screen emulsion described in Example I above. Natural silk No. 8XX was coated with this emulsion by filling a trough with the emulsion, bringing the trough lid into contact with the screen, tilting the trough, thus allowing the emulsion to wet the screen and pulling the trough upwardly. In this manner, a thin coating was deposited on the screen. After drying for one hour at room temperature, the screen was exposed in the conventional manner and developed. The stencil so obtained was excellent. A second screen coated in a similar manner and stored for four weeks in the absence of light prior to exposure gave similar good results.

*Example XV*

An emulsion prepared according to the procedure of Example XI above was coated onto a number 10 Orlon screen by brushing on the sensitizer according to the method described in Example XI. After drying with the aid of a stream of warm air, a second coat was applied from both sides using a trough and following the method described in Example XIV above. This second coat was dried in the same manner mentioned above and the screen thus obtained was exposed under a positive original in the conventional manner. After development with water, an excellent screen was obtained. In similar manner a stainless steel screen of 200 mesh was coated and, after drying at room temperature, the screen was stored for two weeks at a temperature of 40° C. and then processed. Development was rapid and a good stencil was obtained.

*Example XVI*

An emulsion sensitized according to the procedure of Example XI above was coated onto an organdy No. 10 screen by brushing on the emulsion and removing the excess with a rubber squeegee. After drying, the coated screen was exposed in the conventional manner; it developed easily giving an excellent stencil. A second screen was stored, after coating and drying, for two months in the absence of light at room temperature and this screen, after exposure, developed readily giving a clean and sharp stencil.

*Example XVII*

For coating Japanese tissue, the sensitized emulsion described in Example XI above was used. The sensitized emulsion was diluted with an equal amount of water and placed in an ordinary tray. The paper is pulled through the solution so that one side is coated and then hung up to dry. When dry, the coated paper is exposed in contact with a photographic positive flat. Development, i.e., removal of the unexposed areas, is effected by placing the exposed tissue on a hard flat surface, such as glass, and spraying with warm tap water. The developed stencil is then dried.

The finished stencil is placed under an uncoated clean screen of the type mentioned above and printed in the same manner as screens having stencils directly on their surfaces. The paint itself, which is forced around the carrier strands, acts as a bond and holds the paper in position on the mesh.

*Example XVIII*

To demonstrate the applicability of the present invention to various types of colloids, a series of runs was made using various colloids. In this example, a polyvinyl alcohol of a high degree of hydrolyzation was used. The polyvinyl alcohol is marketed under the name of Elvanol 71/24 by Du Pont and has a degree of hydrolyzation of 97.9 to 98.7%. 13 grams of the solid polyvinyl alcohol were added slowly to 100 ml. of water and charged into a Waring blender. During addition of the polyvinyl alcohol, the blender was set at "low speed" and, after the powder had been added, it was set to "high speed." Mixing was continued for one hour during which period the temperature rose to about 65° C. After the addition of makeup water, to compensate for evaporation, and reblending for a short period of time, the solution was permitted to stand until the air bubbles had escaped. To this solution was added a solution of 0.5 gram of a diazo sensitizer prepared according to the procedure of Example I of copending application Serial No. 124,791 in 10 ml. of water and the mixture was coated on a screen in accordance with the procedure of Example I above. The screen was tested in accordance with the procedure of Example I and no stencil wear was evident after 10,000 strokes on the abrasion tester.

*Example XIX*

In this example, a partially acylated polyvinyl alcohol, marketed under the name of Elvanol 52/22, with a high degree of hydrolyzation of 86 to 89% was used. The partially acylated polyvinyl alcohol solution was prepared in the manner described in Example XVIII above. To it was added a solution of 2 grams of a condensation product prepared according to the procedure of Example III of copending application Serial No. 124,786 dissolved in 10 ml. of water. The solution was coated onto a screen in accordance with the procedure of Example I above and a stencil with a sharp image was obtained which showed no evidence of wear after 15,000 strokes in the abrasion tester described in Example I above. The same emulsion sensitized with 2% ammonium dichromate, gave a poor quality image with ragged edges which broke down much more rapidly on the abrasion tester.

*Example XX*

In this example a polyvinyl acetate dispersion was employed. To 700 grams of Plyamul 9350 HW (manufactured by Reichhold Chemicals, Inc.), which is a vinyl acetate homopolymer with a minimum total solids content of 55%, 37 grams of dibutylphthalate plasticizer were added and the mixture was stirred for one hour. To 100 grams of this mixture was added a solution of 2 grams of the condensation product prepared according to the procedure of Example I of copending application Serial No. 124,791 dissolved in 10 ml. of water. This basic emulsion was coated onto a nylon screen and, after exposure to a positive original and development with a warm jet of water, a good clear image was obtained which showed no evidence of breakdown after 15,000 strokes on the abrasion tester described in Example I above. The same emulsion sensitized with 2% ammonium dichromate gave a poor quality image which broke down before the completion of 4,000 strokes on the abrasion tester.

*Example XXI*

In this example a partially hydrolyzed polyvinyl acetate was employed. 10 grams of a partially hydrolyzed polyvinyl acetate, obtained from the Celanese Corporation, were dissolved in 90 grams of dimethyl-formamide and sensitized with one gram of the diazo sensitizer prepared according to the procedure in Example I of copending application Serial No. 124,791 dissolved in 10 grams of a 50:50 solution of methanol-acetone. After coating on a porous carrier, exposure and development, following the procedure of Example I above, a stencil was obtained which was far more durable on the abrasion tester than any of the ammonium dichromate sensitized coatings.

*Example XXII*

In this example a polyvinyl formal was used. 20 grams of Formvar 7/70 (manufactured by Shawinigan Resins) were dissolved in 80 grams of ethyl Cellosolve and to this solution was added one gram of a diazo sensitizer prepared according to the procedure of Example I of copending application Serial No. 124,791 dissolved in 10 grams of ethyl Cellosolve.

This solution was applied with a trough to a nylon screen and, after exposure to a positive flat and development, a stencil was obtained which not only was extremely durable, but also showed very good resistance to highly alkaline textile paints. Using such a paint with a pH in excess of 12, more than 15,000 prints were made without breakdown of the stencil. Standard emulsions sensitized with dichromate permit at the very best only a few thousand prints under these conditions.

*Example XXIII*

In this example methyl cellulose was employed. 20 grams of Methocel 65HG (made by The Dow Chemical Corporation) were dissolved in 800 grams of water and to 90 grams of this stock solution, 10 grams of a sensitizer solution, containing between 5 and 20% of a sensitizer prepared according to the procedure of Example I of copending application Serial No. 124,791 were mixed in thoroughly, resulting in a smooth emulsion. This emulsion was easily applied to porous carriers and, after exposure, developed readily with water, resulting in a stencil having a sharp, well defined image. Conversely, the same stock solution, sensitized with ammonium dichromate, did not harden properly upon exposure to light and as a result the stencil swelled excessively upon development with water so that the exposed areas which should form the stencil resist broke away during development.

*Example XXIV*

To obtain special effects, such as coloring the stencil or thickening the stencil film, fillers may be added to the emulsion. For example, 0.5% of Cab-O-Sil colloidal silica was blended into 100 grams of the commercial silk screen emulsion described in Example I above, sensitized with a 0.75% of a diazo sensitizer prepared according to the procedure of Example I of copending application Serial No. 124,791.

The addition of the colloidal silica resulted in a bodied stencil having excellent image definition and a durability greatly in excess of products containing ammonium dichromate. Thousands of prints were made without loss of detail or breakdown of the stencil.

It will be obvious to those skilled in the art that many modifications may be made within the scope of the present invention without departing from the spirit thereof, and the invention includes all such modifications.

What is claimed is:

1. A presensitized material for screen process printing comprising a highly porous carrier coated with at least one colloid containing as a sensitizer at least one completely water-soluble condensation product of at least one diazo diphenylamine with at least one aldehyde, condensed in the presence of at least one strong acid.

2. A presensitized material for screen process printing comprising a highly porous carrier coated with at least one organic colloid containing as a sensitizer at least one completely water-soluble condensation product of at least one diazo diphenylamine with at least one lower aliphatic aldehyde, condensed in the presence of at least one strong inorganic acid.

3. A presensitized material for screen process printing comprising a highly porous carrier coated with at least one organic colloid containing as a sensitizer at least one completely water-soluble condensation product of diazo diphenylamine with formaldehyde, condensed in the presence of at least one strong inorganic acid.

4. A presensitized material for screen process printing according to claim 3 in which commercial polyvinyl alcohol is used as the colloid.

5. A presensitized material for screen process printing according to claim 3 in which a partially acylated polyvinyl alcohol is used as the colloid.

6. A presensitized material for screen process printing according to claim 3 in which a commercial polyvinyl acetate dispersion is used as the colloid.

7. A presensitized material for screen process printing according to claim 3 in which mixtures of polyvinyl alcohol and polyvinyl acetate are used as the colloid.

8. A presensitized material for screen process printing according to claim 3 in which mixtures of partially acylated polyvinyl alcohol and polyvinyl acetate are used as the colloid.

9. A presensitized material for screen process printing according to claim 3 in which commercial polyvinyl acetal is used as the colloid.

10. A presensitized material for screen process printing comprising a highly porous carrier coated with at least one organic colloid containing as a sensitizer at least one completely water-soluble condensation product of diazo diphenylamine with formaldehyde, condensed in the presence of a strong inorganic acid selected from the group consisting of a hydrochloric acid, hydrobromic acid, hydrofluoric acid and sulfuric acid.

11. A presensitized material for screen process printing, comprising a highly porous carrier coated with at least one organic colloid containing as a sensitizer at least one completely water-soluble condensation product of diazo diphenylamine with formaldehyde, condensed in the presence of hydrobromic acid.

12. A presensitized material for screen process printing, comprising a highly porous carrier coated with at least one organic colloid containing as a sensitizer at least one completely water-soluble condensation product of diazo diphenylamine with formaldehyde, condensed in the presence of phosphoric acid.

13. A presensitized material for screen process printing comprising a highly porous carrier coated with at least one organic colloid containing as a sensitizer at least one completely water-soluble condensation product of diazo diphenylamine with formaldehyde, condensed in the presence of sulfuric acid.

14. A presensitized material for screen process printing, comprising a highly porous carrier coated with at least one organic colloid containing as a sensitizer at least one completely water-soluble condensation product of diazo diphenylamine with formaldehyde, condensed in the presence of hydrochloric acid.

15. A presensitized material for screen process printing, comprising a highly porous carrier coated with at least one organic colloid containing as a sensitizer at least one completely water-soluble condensation product of diazo diphenylamine with formaldehyde, condensed in the presence of hydrofluoric acid.

16. A presensitized material for screen process printing, according to claim 10 in which the condensation product of diazo diphenylamine and formaldehyde is present in the form of a salt in which the anions of the salt are anions of at least one acid selected from the group consisting of hydrochloric acid, hydrobromic, hydrofluoric, and sulfuric acid.

17. A process for the preparation of a stencil for screen process printing comprising applying to a highly porous carrier a mixture of a material selected from the group consisting of a solution and a dispersion of at least one organic colloid and, as a sensitizer, at least one completely water-soluble condensation product of at least one diazo diphenylamine with at least one aldehyde condensed in the presence of a strong acid, subsequently removing the solvent, whereby a material is formed in which sensitized colloid covers at least the pores of the carrier, hardening the colloid by exposure thereof to light under a pattern, and removing the colloid from those portions of the carrier not struck by light to open the pores of the material in such portions.

18. A process for the preparation of a stencil for screen process printing comprising applying to a highly porous carrier a mixture of a material selected from the group consisting of a solution and a dispersion of at least one organic colloid and, as a sensitizer, at least one completely water-soluble condensation product of at least one diazo diphenylamine with at least one lower aliphatic aldehyde condensed in the presenec of at least one strong inorganic acid and subsequently removing the solvent of the solution, whereby a material is formed in which sensitized colloid covers at least the pores of the carrier, hardening the colloid by exposure thereof to light under a pattern and removing the colloid from those portions of the carrier not struck by light to open the pores of the material in such portions.

19. A coating composition for the preparation of a material for screen process printing comprising a mixture of a material selected from the group consisting of a solution and a dispersion of at least one colloid and a minor amount of at least one completely water-soluble condensation product of at least one diazo diphenylamine with at least one aldehyde condensed in the presence of at least one strong acid.

20. A coating composition for the preparation of a material for screen process printing comprising a mixture of a material selected from the group consisting of a solution and a dispersion of at least one organic colloid and a minor amount of at least one completely water-soluble condensation product of a diazo diphenylamine with at least one lower aliphatic aldehyde condensed in the presence of at least one strong inorganic acid.

21. A coating composition for the preparation of a material for screen process printing according to claim 19 in which the colloid is a commercial polyvinyl acetate dispersion.

22. A coating composition for the preparation of a material for screen process printing according to claim 19 in which the colloid is a mixture of a commercial polyvinyl acetate dispersion and polyvinyl alcohol.

23. A coating composition for the preparation of a material for screen process printing according to claim 19 in which the colloid is polyvinyl alcohol.

24. A coating composition for the preparation of a material for screen process printing according to claim 19 in which the colloid is a partially acylated polyvinyl alcohol.

25. A coating composition of the preparation of a material for screen process printing according to claim 20 in which the colloid is a commercial polyvinyl acetate dispersion.

26. A coating composition for the preparation of a material for screen process printing according to claim 20 in which the colloid is a mixture of polyvinyl alcohol and a commercial polyvinyl acetate dispersion.

27. A coating composition for the preparation of a material for screen process printing according to claim 20 in which the colloid is a partially acylated polyvinyl alcohol.

28. A coating composition for the preparation of a material for screen process printing comprising an aqueous solution of polyvinyl alcohol and a minor amount of a completely water-soluble condensation product of a diazo diphenylamine with formaldehyde, condensed in the presence of hydrochloric acid.

29. A coating composition for the preparation of a material for screen process printing comprising an aqueous solution of polyvinyl alcohol and a minor amount of a completely water-soluble condensation product of diazo diphenylamine with formaldehyde, condensed, in the presence of hydrobromic acid.

30. A coating composition for the preparation of a material for screen process printing comprising an aqueous solution of polyvinyl alcohol and a minor amount of a completely water-soluble condensation product of diazo diphenylamine with formaldehyde, condensed in the presence of hydrofluoric acid.

31. A coating composition for the preparation of a material or screen process printing comprising an aqueous solution of polyvinyl alcohol and a minor amount of a completely water-soluble condensation product of diazo diphenylamine with formaldehyde, condensed in the presence of sulfuric acid.

32. A coating composition for the preparation of a material for screen process printing comprising an aqueous solution of polyvinyl alcohol and a minor amount of a completely water-soluble condensation product of diazo diphenylamine with formaldehyde, condensed in the presence of phosphoric acid.

33. A coating composition for the preparation of a material for screen process printing comprising an aqueous dispersion of a commercial polyvinyl acetate and a minor amount of a completely water-soluble condensation product of diazo diphenylamine with formaldehyde, condensed in the presence of hydrochloric acid.

34. A coating composition for the preparation of a material for screen process printing comprising an aqueous dispersion of a commercial polyvinyl acetate and a minor amount of a completely water-soluble condensation product of diazo diphenylamine with formaldehyde, condensed in the presence of hydrobromic acid.

35. A coating composition for the preparation of a material for screen process printing comprising an aqueous dispersion of a commercial polyvinyl acetate and a minor amount of a completely water-soluble condensation product of diazo diphenylamine with formaldehyde, condensed in the presence of hydrofluoric acid.

36. A coating composition for the preparation of a material for screen process printing comprising an aqueous dispersion of a commercial polyvinyl acetate and a minor amount of a completely water-soluble condensation product of diazo diphenylamine with formaldehyde, condensed in the presence of sulfuric acid.

37. A coating composition for the preparation of a material for screen process printing comprising an aqueous dispersion of a commercial polyvinyl acetate and a minor amount of a completely water-soluble condensation product of diazo diphenylamine with formaldehyde, condensed in the presence of phosphoric acid.

38. A coating composition for the preparation of a material for screen process printing comprising an aqueous solution of a partially acylated polyvinyl alcohol and a minor amount of a completely water-soluble condensation product of diazo diphenylamine with formaldehyde, condensed in the presence of phosphoric acid.

39. A coating composition for the preparation of a material for screen process printing comprising an aqueous solution of polyvinyl alcohol and a dispersion of polyvinyl acetate and a minor amount of a completely water-soluble condensation product of diazo diphenylamine with formaldehyde, condensed in the presence of hydrochloric acid.

40. A coating composition for the preparation of a material for screen process printing comprising an aqueous solution of polyvinyl alcohol and a dispersion of polyvinyl acetate and a minor amount of a completely water-soluble condensation product of diazo diphenylamine, condensed with formaldehyde in the presence of hydrobromic acid.

41. A coating composition for the preparation of a material for screen process printing comprising an aqueous solution of polyvinyl alcohol and a dispersion of polyvinyl acetate and a minor amount of a completely water-soluble condensation product of diazo diphenylamine, condensed with formaldehyde in the presence of hydrofluoric acid.

42. A coating composition for the preparation of a material for screen process printing comprising an aqueous solution of polyvinyl alcohol and a dispersion of polyvinyl acetate and a minor amount of a completely water-soluble condensation product of diazo diphenylamine with formaldehyde, condensed in the presence of sulfuric acid.

43. A coating composition for the preparation of a material for screen process printing comprising an aqueous solution of polyvinyl alcohol and a dispersion of polyvinyl acetate and a minor amount of a completely water-soluble condensation product of diazo diphenylamine with formaldehyde, condensed in the presence of phosphoric acid.

44. A coating composition of the preparation of a material for screen process printing comprising a solution, in an organic solvent, of at least one colloid and a minor amount of at least one completely water-soluble condensation product of at least one diazo diphenylamine with at least one aldehyde condensed in the presence of at least one strong acid.

45. A coating composition for the preparation of a material for screen process printing comprising a solution, in an organic solvent, of a partially hydrolyzed polyvinyl acetate and a minor amount of a completely water-soluble condensation product of diazo diphenylamine with paraformaldehyde, condensed in the presence of phosphoric acid.

46. A coating composition for the preparation of a material for screen process printing comprising a solution, in an organic solvent, of polyvinyl formal and a minor amount of a completely water-soluble condensation product of diazo diphenylamine with paraformaldehyde, condensed in the presence of phosphoric acid.

47. A process for the preparation of a stencil for screen process printing which comprises exposing to light under a master a light-sensitive coating supported by a highly porous carrier, and removing the coating from the carrier in those portions thereof not struck by light to open the pores of the carrier in such portions, the coating comprising at least one colloid containing as a sensitizer at least one completely water-soluble condensation product of at least one diazo diphenylamine with at least one aldehyde, condensed in the presence of at least one strong acid.

48. A process for the preparation of a stencil for screen process printing which comprises exposing to light under a master a light-sensitive coating supported by a highly porous carrier, and removing the coating from the carrier in those portions thereof not struck by light to open the pores of the carrier in such portions, the coating comprising at least one colloid containing as a sensitizer at least one completely water-soluble condensation product of at least one diazo diphenylamine with at least one lower aliphatic aldehyde, condensed in the presence of at least one strong inorganic acid.

49. A process according to claim 48 in which the colloid comprises polyvinyl alcohol and the acid comprises phosphoric acid.

References Cited by the Examiner

UNITED STATES PATENTS

| | | | |
|---|---|---|---|
| 2,063,631 | 12/1936 | Schmidt | 260—72.5 |
| 2,100,063 | 11/1937 | Zahn | 96—91 |
| 2,679,498 | 5/1954 | Seven et al. | 96—91 X |
| 2,714,066 | 7/1955 | Jewett et al. | 96—86 X |
| 2,873,207 | 2/1959 | Weegar et al. | 96—91 X |
| 2,982,648 | 5/1961 | Herrick et al. | 96—91 X |
| 3,050,502 | 8/1962 | Mellan | 96—33 |

OTHER REFERENCES

Kosloff, Screen Process Printing, 1950, Times Publishing Co. Cinn., Ohio, pp. 90–97.

Jorgensen et al. The Sensitivity of Bichromated Coatings, 1954, Lithographic Tech. Foundation, N.Y., page 146.

NORMAN G. TORCHIN, *Primary Examiner.*